United States Patent [19]

Caton

[11] Patent Number: 5,078,793
[45] Date of Patent: Jan. 7, 1992

[54] SPRAY DRYING METHOD FOR PREPARING KAOLIN AS A PIGMENT EXTENDER

[75] Inventor: Dennis W. Caton, Marion, Iowa

[73] Assignee: Pacemaker, Ltd., Rock Island, Ill.

[21] Appl. No.: 470,926

[22] Filed: Jan. 26, 1990

[51] Int. Cl.$^5$ .................. C04B 14/20; C04B 14/30; C09C 1/36
[52] U.S. Cl. ................................ 106/417; 106/416; 106/436; 106/437; 106/442; 106/446
[58] Field of Search ............... 106/436, 437, 468, 416, 106/442, 445, 446, 447; 428/702, 703, 450, 454; 507/148, 149, 150

[56] References Cited

U.S. PATENT DOCUMENTS

| | | | |
|---|---|---|---|
| 3,117,883 | 1/1964 | Gilchrist | 106/416 |
| 3,222,193 | 12/1965 | Hanrahan | 426/470 |
| 3,453,131 | 6/1969 | Fadner | 106/416 |
| 3,458,395 | 7/1969 | Stalker | 162/175 |
| 3,726,700 | 4/1973 | Wildt | 106/437 |
| 4,180,593 | 12/1979 | Cohan | 426/72 |
| 4,295,933 | 10/1981 | Smith | 162/168.3 |

FOREIGN PATENT DOCUMENTS 1405751 9/1975 United Kingdom .

OTHER PUBLICATIONS

Ansilex 93 in Paper Filling Applications TI 803, from commercial of Englehard Corp. (publication date unknown).
Chang et al., An Investigation into the Mechanism of Titanium-Dioxide Entension by Calsium Carbonate, Tappi Journal, pp. 128-131 (1988).
"Grant and Hackh's Chemical Dictionary", Fifth Edition, pp. 121,178, 461 and 552; McGraw-Hill, N.Y.; 1987.

Primary Examiner—William R. Dixon, Jr.
Assistant Examiner—Scott L. Hertzog
Attorney, Agent, or Firm—Tilton, Fallon, Lungmus & Chestnut

[57] ABSTRACT

Composite white pigments composed of titanium dioxide ($TiO_2$) and kaolin are prepared by subjecting kaolin slurry to spray drying with injected gas to promote droplet fluffing and fragmentation. The slurry contains a hydrocolloid suspending agent and a cationic reagent for making the kaolin particles cationic. The frangible dry material thus produced can be blended with $TiO_2$ particles to produce an extended $TiO_2$ pigment.

8 Claims, 1 Drawing Sheet

SPRAY DRYING METHOD FOR PREPARING KAOLIN AS A PIGMENT EXTENDER

FIELD OF THE INVENTION

The general field of the invention is mineral particles that are used as white pigments in the manufacture of paper, plastics, and paints. This invention is particularly concerned with titanium dioxide ($TiO_2$) pigments is used in the manufacture of plastics.

BACKGROUND OF INVENTION

Mineral particles such as calcium carbonate, kaolin, and titanium dioxide are widely used as white pigments in paper, plastics, and paints. Titanium dioxide ($TiO_2$) pigments are the most expensive of the white mineral pigments. $TiO_2$ pigments are used in preference to other white pigments because of their outstanding properties for providing whiteness and opacity. In plastics, only low levels (viz. 1-2%) of $TiO_2$ pigments are needed, but this adds significantly to the cost of manufacture. To reduce $TiO_2$ pigment cost, there has been an extensive search for additives or extenders of $TiO_2$ in plastics.

$TiO_2$ pigments are also used in papermaking. U.S. Pat. No. 3,458,395 describes the preparation of coated titanium dioxide pigments using a coating of aminated polysaccharide. The coated titanium dioxide is described as providing improved retention in paper making.

Calcined clay (kaolin clay) has been used as an extender of $TiO_2$ in papermaking, and in paints. For example, the Engelhard Corporation in a publication entitled "ANSILEX 93 in Paperfilling Applications" recommends combining 16 pounds of ANSILEX 93 (calcined clay) with 48.5 pounds of $TiO_2$ to obtain comparable brightness and opacity to the use of 57 pounds of $TiO_2$ in a paper furnish.

Particulate calcium carbonate has been proposed as an extender for $TiO_2$ as a whitening and brightening agent in the manufacture of paper: Chang and Scott, "An investigation into the mechanism of titaniumdioxide extension by calcium carbonate", Tappi Journal, October, 1988, pages 128-131. This study concluded that although calcium carbonate particles can enhance the light-scattering behavior of $TiO_2$, there is no specific interaction between the particles of $CaCO_3$ and $TiO_2$.

It has also been proposed to pretreat a mineral filler (e.g., calcium carbonate) with an organic polymeric material (e.g., an acrylate polymer) to improve performance of the $CaCO_3$ particles. As described in British Patent 1,405,751, a slurry is formed from the mineral particles and an acrylate polymer emulsion, and the slurry is spray dried to produce a powdery product. This patent describes ordinary spray drying. It is also known to spray dry a slurry injected with a gas to produce porous or fluffy spray-dried products. (See, for example, U.S. Pat. Nos. 3,222,193 and 4,180,593.)

In the manufacture of plastics both rutile and anastase titanium dioxide are used as whitening pigments. They can be used alone or in combination with colorants. For maximum effectiveness, rutile titanium dioxide is preferred because of its high refractive index (2.7), but anastase $TiO_2$ is cheaper. Titanium dioxide particles are typically irregular particles with their largest dimension in a size range of 0.2 to 0.3 microns. The level of opacity of a plastic part is determined by the amount of added material that has a refractive index different than that of the substrate. Consequently, if more opacity is needed in a particular application, more titanium dioxide must be used to accomplish this where a white or light pastel color is desired. This adds to the manufacturing cost.

The requirements for a whitening agent in plastics are different than in paper making. Between paper and plastics are sufficient differentials between the refractive indices of the medium and inorganic fillers which determine light reflection effects. In papermaking titanium dioxide pigments used alone or with fillers such as kaolin clay can provide brightness, whiteness, opacity, and light scattering to the paper. Titanium dioxide extenders in paper making such as kaolin or calcium carbonate can help deagglomerate titanium dioxide particles by filling in the spaces between the $TiO_2$ particles. No specific interaction or particle bonding has been observed.

Unlike paper, however, the refractive indices of plastic polymers are relatively high and are close or equal to those of most inorganic fillers such as kaolin. Consequently, with kaolin particles, for example, there is little or no light reflected and no benefit optically to their use as a plastic filler. When used as extenders for titanium dioxide, inorganic fillers have heretofore been limited to a few percent substitutions for the $TiO_2$. Higher loading has resulted in losses in reflectivity, opacity, and brightness. Kaolin clay heretofore has not been a significantly effective extender for $TiO_2$ in plastics.

For a mineral filler to function as an extender for titanium dioxide, it must possess a combination of properties which have proven very difficult to achieve. As an initial requirement, the extender must be substantially less expensive than the $TiO_2$ pigments, while having a high refractive index and being usable in the plastic without adverse effects. When combined with the $TiO_2$ the resulting color and opacity should be substantially as good as where an equivalent amount of $TiO_2$ is used alone. As far as is known, up to the present invention no inorganic filler has been developed which satisfies the commercial requirements for effectively extending $TiO_2$ in plastics.

SUMMARY OF INVENTION

Heretofore kaolin clay has not been functionally effective as an appreciable extender of titanium dioxide pigments in plastic formulations. When as little as 5 to 10 parts of kaolin are combined with 90 to 95 parts of $TiO_2$, the resulting whiteness and opacity of the the plastic are significantly reduced. By the method and product of this invention calcined kaolin particles can be combined in substantially larger proportions with $TiO_2$ without appreciable loss of whiteness and opacity.

For purposes of the present invention, the kaolin particles are first prepared as a sprayable slurry comprising an aqueous hydrocolloid suspension of calcined anionic white kaolin particles in admixture with a cationic polymer, or a reagent capable of binding or coating the kaolin particles and making them cationic. The prepared slurry of the kaolin particles is subjected to drying in a spray drier. Gas injection-type spray drying is preferred. With this method, air or other gas under pressure is combined with the slurry as it is atomized. The added gas promotes droplet fluffing and fragmentation, which tends to prevent the formation of dense, hard agglomerates of the kaolin particles. By using gas injection spray drying, the resulting product can be a fluffed, fragmented material in which the individual particles of kaolin are loosely agglomerated. The surface charge properties of the kaolin have been modified from essentially anionic to essentially cationic.

The fluffy, dry material comprising the coated cationic kaolin particles is in a loosely aggregated form. It can be directly dry blended with titanium dioxide pigment particles. An ordinary mixer can be employed for this blending, such as a ribbon blender. The kaolin material is broken up to small aggregates or to largely individual kaolin particles which can be brought into intimate contact with individual $TiO_2$ particles. Since the $TiO_2$ particles have predominately anionic surface charges, a cationic-anionic interaction may occur between the particles. Whatever the mechanism, experimental evidence indicates that a specific bonding interaction occurs between the $TiO_2$ and the modified clay particles. Since dry blending forms the $TiO_2$/clay aggregates, Van der Waal's forces may also be operative.

The kaolin particles are of substantially larger size than the $TiO_2$ particles. A multiplicity of $TiO_2$ particles can surround and interactively bind to the modified kaolin particles or aggregates of kaolin particles. It is the resulting composite of the kaolin and $TiO_2$ which functions as an effective extender of $TiO_2$. Present experimental results indicate that as such as 10 to 25% of the $TiO_2$ can be replaced with the chemically-modified, spray-dried kaolin.

Pre-blending or dry mixing of the modified kaolin with the titanium dioxide can be carried out as one way of practicing the present invention. The resulting composite can then be used as a pigment additive in the manufacture of plastics. A common method of adding colorants to plastics utilizes pre-formed solid pellets. The pre-formed composites of this invention can be used as an ingredient of these pellets, or, alternatively, a modified clay can be combined with the $TiO_2$ in the formation of these pellets, which, as a first step, involves dry-blending the pellet components, including resin, titanium dioxide, optional added color, and usually a dispersant or a wax. It appears to be optional whether the composites of this invention are preformed or are formed in situ during the preparation of the color pellets. In either procedure, modified spray dried particles or clay particle aggregates can combine with the $TiO_2$ particles to form the composites of this invention.

THE DRAWINGS

One preferred method of preparing the composite white pigment product of this invention is illustrated by the accompanying diagrammatic drawings.

FIG. 1 is a flowsheet illustrating processing of kaolin to produce a dry fluffy material for blending with $TiO_2$ as illustrated in FIG. 2.

DETAILED DESCRIPTION

Figures 1, 2:
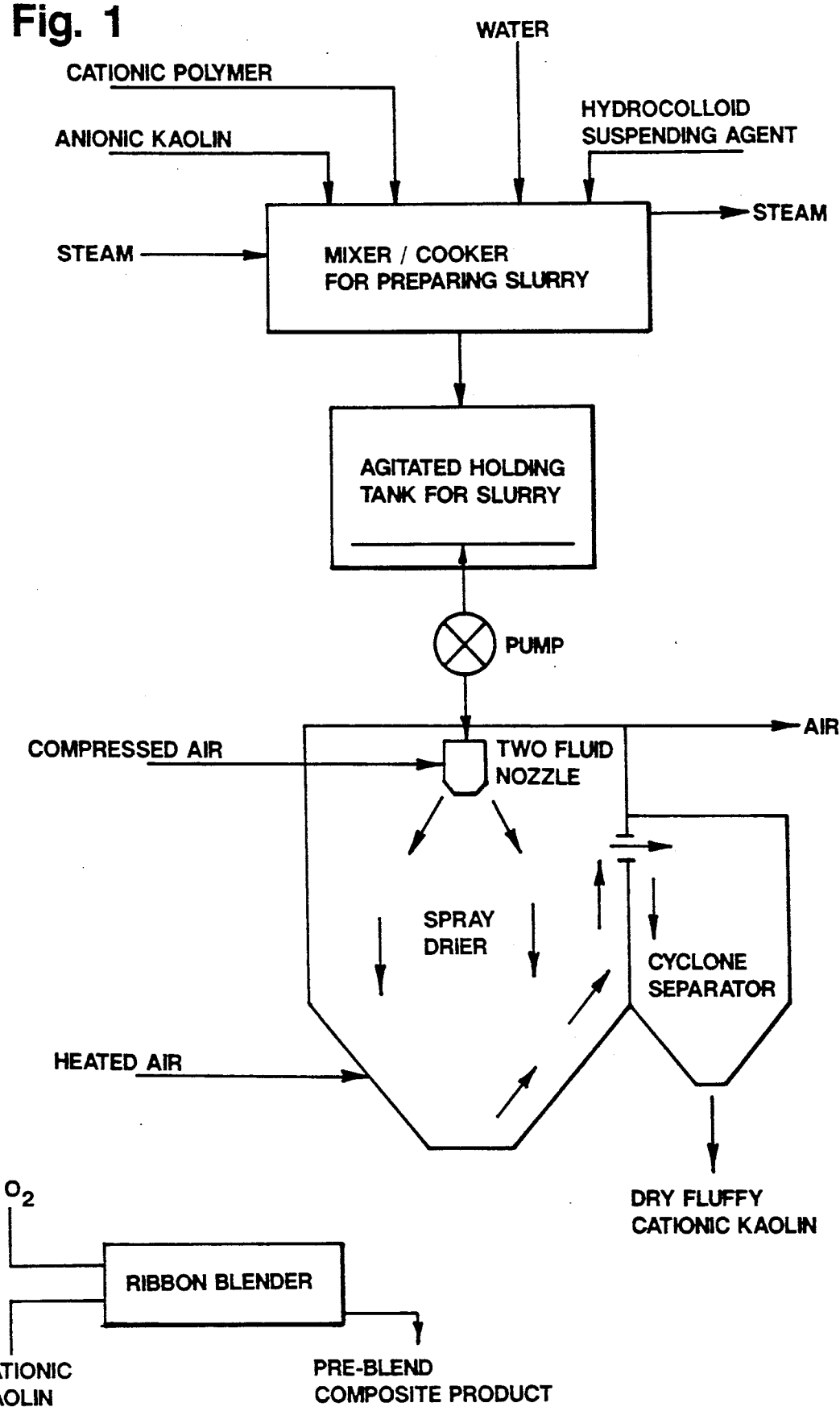

For purpose of this invention, the preferred kaolin clay to be used is a purified anionic kaolin usable as a white pigment. Water-washed calcined kaolin is especially suitable. Kaolin clays are aluminum polysilicates and are primarily anionic in character. After water-washing, the natural kaolins may be spray-dried. Particles of kaolin may be separated by delamination. Kaolins which have been purified and calcined at high temperatures are known commercially as "calcined kaolins" and are available from commercial sources. For example, a calcined kaolin is sold under the trade name "ANSILEX 93" and is available from Engelhard Corporation, Edison, N.J. The kaolin particles are plate-like in form, and are sometimes referred to as platelets. They may range in their longest dimension from 0.5 to 10 microns. Typical long dimension size for the kaolin particles is from about 1 to 3 microns.

Commercially, two types of titanium dioxide are available, anastase and rutile, which have slightly different crystal structures that result in different refractive indexes. Anastase has a refractive index of 2.52 and rutile 2.76. Anastase is less abrasive than rutile, but rutile has the advantage of providing the higher refractive index. Either anastase or rutile tinium dioxides can be used in the present invention. For optimum whiteness and opacity, it is preferred to employ rutile $TiO_2$. The $TiO_2$ particles may range in long dimension size from 0.1 to 0.5 microns. Typical average long dimension size is from 0.2 to 0.3 microns.

In practicing the method of this invention for comparing n composite white pigment product, a sprayable slurry is prepared comprising an aqueous hydrocolloid suspension of calcined anionic white kaolin particles in admixture with a cationic polymer or cationic agent for modifying the kaolin particles and making their surfaces essentially cationic. The hydrocolloid used as a suspending agent may be cooked starch, such as potato starch or corn starch. The starch may be unmodified, or it may be cationic starch such as a starch containing tertiary amine or quaternary ammonium groups. When a cationic starch is employed, it can perform both the functions of a hydrocolloid suspension and a cationic polymer. However, it is preferred to employ a separate cationic polymer in addition to a non-ionic hydrocolloid.

Starch is the preferred hydrocolloid since it is effective for suspending the kaolin particles and has a relatively low cost compared to other commercially available hydrocolloids. However, other hydrocolloids can be used, such as natural or synthetic gums like gelatin, dextran, sodium carboxymethylcellulose, or hydroxyethyl cellulose. Such hydrocolloids are characterized by being polysaccharides and by being hydrophilic and water-adsorbing. As a class, these are recognized as suspending agents for fine solid particles in an aqueous medium.

A sufficient amount of the hydrocolloid should be used to suspend the kaolin particles. However, a large excess is not desirable. For example, from 0.3 to 53 parts by weight of the starch or other hydrocolloid may be employed per 100 parts of kaolin. Using starch, a typical preferred level is from about 0.5 to 2.0 parts by weight of dry starch per 100 parts of kaolin.

The cationic polymer or agent should be water-soluble or water-dispersible. It preferably contains a plurality of amide, tertiary amine, or quaternary ammonium groups. For example, poly(acrylamides), poly(aminopolyamids) and poly(alkylpolyamides) can be used. Polyacrylamides are preferred cationic reagents. These polymers may be substituted with quaternary ammonium or tertiary amine groups but quaternary groups are preferred is being more strongly cationic. The degree of substitution on a weight basis can be from 1 to 10% of the substituted polymer. Polymer lengths can vary but high molecular weight poly(acrylamides) are preferred. Average molecular weight can range from 200,000 to 20,000,000. Polymers with average molecular weights above 500,000 are preferred, such as the 1,000,000 to 10,000,000 range.

In general, a sufficient amount of the cationic polymer or reagent should be employed to react with the anionic surfaces of the kaolin and make them essentially cationic. For example, from 0.1 to 5 parts by weight of the cationic polymer or reagent may be employed per 100 parts of kaolin. With polyacrylamide and other similar rationic polymers, a typical range is from about 0.2 to 1.0 parts by weight per 100 parts of kaolin.

The slurry as prepared for spray drying can be relatively concentrated. For example, it may contain a total of 10 to 50 parts by weight of total solids per 100 parts water. The solids include the kaolin, the hydrocolloid suspending agent, and cationic polymer or reagent on a dry basis. Typically, the slurry may contain from 30 to 45% solids per 100 parts of water. The primary requirement is that the slurry be sprayable and that the kaolin particles are substantially homogeneously dispersed and suspended. In general, relatively high concentration slurries are preferred in order to reduce the amount of water to be removed in the spray drying.

Standard commercial spray drying equipment can be employed for carrying out the spray drying step. One suitable type of spray dryer is referred to as a two-fluid inlets or nozzle, providing mixing of two streams or entrances to the spray dryer. For example, one nozzle can be used for introducing the slurry and the other for introducing the gas into the slurry.

The slurry is pumped into its spray dryer nozzle under sufficient pressure to produce an atomized spray, as is well known in the spray dryer art. The gas, which is preferably air, but may be nitrogen or other gas, is injected into the slurry under pressure through the other inlet nozzle. For example, in a pilot spray unit, nitrogen or air was injected under pressures of 25 to 75 psig, and the slurry was pumped at pressures of 100 to 150 psig.

The purpose of using gas injection is to minimize the formation of the hard spherical aggregates which can result from drying atomized spherical droplets. The mixture of the slurry and the gas results tend to form droplets which are porous and which easily fragment. The gas serves to fluff and fragment the atomized droplets. The resulting dry material has a soft frangible character, and can easily be reduced to a finer particulate size by mechanical working, such as by ordinary mixing or blending. With a product of this character, it is not necessary to pre-grind or otherwise prepare the spray-dried material for dry mixing with the titanium dioxide.

After the irregular fluffy dry material has been collected from the spray dryer, it can be directly combined with the anionic titanium dioxide pigment particles. For example, the spray dried material in a proportioned amount may be introduced into a batch or continuous mixer. In the mixer, the $TiO_2$ and the spray dried material are brought into intimate contact. The average size of the sprayed material is also reduced which promotes contacting of individual particles or small aggregates. The mixing may be carried out so that essentially individual kaolin particles are brought into contact with a plurality of individual $TiO_2$ particles. Dry mixing can promote surface bonding between the two types of particles. Further, the kaolin particles are of considerably larger size than the $TiO_2$ particles, it may be visualized that the individual kaolin particles associated with a plurality, probably a multiplicity, of the $TiO_2$ particles. Clusters are formed in which $TiO_2$ particles surround a central modified clay particle or aggregate of clay particles, but the exact binding mechanism involved is not known with certainty.

The pre-blend can be used as a white pigment additive for plastics. The amount of the composite can be at the same level as $TiO_2$ alone, viz. in amounts of from 0.5 to 3% of the plastic formulation. For white or pastel colored plastics, $TiO_2$ can be used in amounts of 1 to 2%.

For purpose of the present invention, the pre-blend product should contain at least 5% by weight of the modified kaolin particles, such as from 5 to 40%. For example, the pre-blend can contain from 5 to 40% by weight of modified kaolin particles together with 60 to 95% $TiO_2$ particles. In preferred embodiments, the blend is composed by weight of from 10 to 30% modified kaolin particles with from 70 to 90% of $TiO_2$ particles.

While the pre-blend product comprising the composite white pigment of this invention has been developed especially for use as a white pigment in plastics, it is believed that it may have other uses where it is desired to replace or extend a $TiO_2$ pigment, such as in certain paints or for certain purposes in papermaking.

There are two forms of colorants that are used in plastics: liquid color dispersions and solid color pellets. The composite $TiO_2$/clay pigments of this invention are believed to be most useful as a component of the solid pellets colorants. Liquid colorants use chemical dispersants and high speed mixers which may tend to break up the composites of this invention and thereby reduce the effectiveness of the composites. Further, it is believed that the composites can be formed in situ during the production of the color pellets but probably cannot be effectively formed if the $TiO_2$ and the modified clay are added separately to the liquid colorants.

Where it is desired to add the $TiO_2$ to the mix used to form color pellets without preblending of the $TiO_2$ and the modified clay, this can be done when the initial step of color pellet production is dry blending. When the $TiO_2$ and modified clay are added to the dry blender, the composites can be formed in situ and can then be combined into the color pellets in accordance with known procedures. In such color pellet production, the resin corresponding to that to which the pellets are to be added is employed as one of the ingredients, and the resin after admixture with the titanium dioxide, clay, and other ingredients is extruded to form the pellets which are then used as the colorant for the plastic before it is molded or otherwise formed.

FLOWSHEET EXAMPLE

One method for preparing the pre-blend composite product of this invention is illustrated in FIGS. 1 and 2 of the accompanying drawing. As there shown, the ingredients for preparing the slurry are charged to a mixer/cooker wherein they are heated by steam injection. The added ingredients comprise the particulate anionic kaolin, the cationic polymer, water, and the hydrocolloid suspending agent. When the suspending agent is granule starch, it can be cooked or gelatinized in formation of the slurry. If cooking is not required, the slurry can be formed by mixing without heating.

After the slurry has been formed in the mixer/cooker (10), it is passed to an agitated holding tank (11). Sufficient agitation is provided in tank 10 to maintain a substantially homogeneous dispersion of the kaolin in the cooked aqueous starch slurry.

From the holding tank 11, the slurry is transferred through a conduit equipped with a pump 12, and is introduced under pump pressure into one inlet of a two-fluid nozzle 13 positioned at the top of a spray dryer 14. Compressed air is introduced into the other inlet nozzle for combining with the slurry. The slurry/air mixture is atomized into the top of spray dryer 14. Heated air passes upwardly in the dryer, as indicated.

From the spray dryer the fluffed, fragmented, frangible product is passed to a cyclone separator 15. From the separator there is discharged frangible, fluffy aggregates of cationic kaolin, which is ready for combining with particulate titanium dioxide.

In FIG. 2, the cationic kaolin material produced as described with reference to FIG. 1, is introduced into a ribbon blender 16 together with a proportioned amount of $TiO_2$. The ribbon blender 16 may be operated as a continuous flow-through blender to discharge a pre-blended composite product, consisting of kaolin/$TiO_2$ clusters. Within the ribbon blender, the cationic kaolin material is broken up to a finer particulate form for bonding interaction (viz. clustering) with the smaller $TiO_2$ particles.

Where it is desired to form the $TiO_2$/clay composites during preparation of colorant pellets, a similar blending operation can be carried out using, for example, a ribbon blender like Blender 16. The $TiO_2$ is added to the blender together with the other ingredients, including the resin, and optional added color, and a dry dispersant such as zinc stearate or a suitable wax (e.g., Acrowax). The $TiO_2$ and spray-dried clay material will be proportioned as previously described, but the total amount of $TiO_2$ used will be reduced by 10 to 30%. The amount of added color such as ultramarine blue may also be reduced from 10 to 30%. During the dry blending of these ingredients and before forming of the pellets, the composites of this invention are produced in situ and thereby serve the same purpose as when pre-formed, as described above. The cationic spray-dried kaolin aggregates and the finer particles prepared therefrom can be directly added to a blender in which the ingredients are being combined for forming colorant pellets. The $TiO_2$/clay composites of this invention are formed in situ. The following procedural description is illustrative.

PREPARATION OF COLORANT ADDITIVES

Color pellet production involves dry blending the dry components; namely, resin, titanium dioxide, optional added color such as ultramarine blue, or other colorants used in plastics, and a dry dispersant such as zinc stearate or a suitable wax. The composite $TiO_2$/clay pigments of this invention are substituted for the titanium dioxide. From 10 to 30% less of the composite is used on a $TiO_2$ basis. The added color may also be reduced by 10 to 30%. The ingredients are dry blended in commercial dry blending equipment, such as a ribbon blender, which may be provided with high shear intensifier bars to delump the components and produce a fine powder blend. The blend can then be fed to an extruder which heats the mixture, melting the resin, with sufficient shear to fully disperse the color and pigment with the resin before being pelletized. The pellets may vary in size but typically range in diameter from 1/32" to ⅛" and about ⅛" in length.

The resulting pellets can be used in a variety of plastic fabrication methods, such as injection molding, blow molding, etc. The choice of resin depends on the end use. Polypropylene would be used with pellets made with polypropylene, polyethylene pellets with polyethylene, etc. The pellets can be fed to an injection molder, for example, which is basically an extruder. There the pellets are melted with the uncolored resin pellets. Sufficient shear is used to fully disperse the colorant in the resin before the finished product is formed.

Where hot mixing is employed as the means for forming a colorant additive, it is believed essential to use the preformed composite of this invention rather than to add the $TiO_2$ and the spray-dried, modified clay separately. Various procedures are used in the plastics industry involving hot mixing, where the equipment may comprise a Bamberry mixer followed by an extruder, or, alternatively, using the extruder without the Bamberry mixer. In all such procedures, instead of charging the $TiO_2$ as is done in present practice to the hopper of the mixer or the extruder, a pre-blend composite prepared as described in this application will be substituted.

With regard to colorant additives as described above, it should be understood that the additive is a concentrate, and may contain the $TiO_2$ in concentrations as high as 40 to 60%. Therefore, as little as 40 to 60% of the colorant additive may comprise the resin corresponding with the resin with which the additive is to be used.

EXPERIMENTAL EXAMPLES

The method of this invention and the results obtained can be further understood and appreciated from the following experimental examples.

EXAMPLE I 985 lbs of "Astra-paque", calcined clay 10 lbs of unmodified potato starch were slurried in 1500 lbs of water and heated to 205° F. for 30 minutes in a high shear mixer. 5 lbs of an emulsified high molecular weight cationic polyacrylamide with a low charge density of quaternary groups, "Polyplus" 695, was added to the hot dispersion. The dispersion was then pumped to a spray drier using a high pressure pump and a two fluid spray nozzle. Bottled nitrogen was connected to the gas line feeding directly to the spray nozzle at a pressure of 75 psi. The compressed nitrogen had the effect of blowing the otherwise spherical particles into aggregates having a fluffy appearance and having a moisture content of 1.8% and an oil absorption of 97.8%.

The resulting cationically charged calcined clay was then dry blended in proportions of 0.45 grams clay to 1.82 grams of "Tioxide" RFC-6 rutile titanium dioxide and homopolymer polypropylene (227 grams). The dry materials were placed in a vessel and mixed on a paint shaker for 60 seconds. The blended material was then molded on an injection molding machine and made into stepped chips. Two controls were also processed as described. The first was dry a blend of 1% titanium dioxide and polypropylene and the other was a blend of polypropylene and a 20% reduction of titanium dioxide. The chips were then evaluated based on tint strength, reflectivity and color. The extended 80% $TiO_2$/20% clay gave comparable results to the 100% $TiO_2$.

EXAMPLE II

"Astro" X-200 cationic potato starch in an amount of 0.2 lbs. was dispersed in 35 lbs of water and heated to 205° F. before 14.6 lbs of "Astra-Paque", calcined clay, was dispersed with a lightening mixer. 0.1 lbs of Polyplus 695, a high molecular weight cationic polyacrylamide with a low charge density of quaternary groups was added to the dispersion. Increased agitation was required to break up the flocs of clay and produce a smooth dispersion. The dispersion was then spray dried in a pilot dryer using a two fluid nozzle and compressed air fed directly to the spray nozzle at a pressure of 25 psi. The resulting material had a moisture below 1% and had a light fluffy appearance.

EXAMPLE III

An unmodified potato starch in an amount of 0.2 lbs. was dispersed in 35 lbs of water and cooked at a temperature of 205° F. before 14.7 lbs of calcined clay was dispersed with a lightening mixer. 0.1 lb of "Polyplus" 1275, a moderate molecular weight cationic polyacrylamide with a low charge density of tertiary amine groups was added to the dispersion. The dispersion was mixed until smooth and fed to a pilot spray drier with a two fluid nozzle and compressed air being directly fed to the nozzle at a pressures of 25 psi. The resulting powder had a light fluffy appearance and a moisture below 1%.

SOURCES OF COMMERCIAL PRODUCTS

The sources of the commercial products referred to in Examples I to III are: "Astra-paque" is the trade name for calcined clay manufactured by Georgia Kaolin, Union, N.J. "Polyplus" 695 and "Polyplus" 1275 are trade names of products manufactured by Betz Paper-Chem, Inc., Jacksonville, Fla. Polyplus 695 is a polyacrylamide substituted with quaternary ammonium groups which has an average molecular weight of around 10,000 daltons. Polyplus 1275 is a tertiary amine substituted polyacrylamide having an average molecular weight of 250,000 to 400,000 daltons.

Unmodified potato starch can be obtained from Roquette Corporation, Gurnee, Ill. Cationic potato starch, "Astro" X-200, is manufactured by Penford Products Company, Inc., Cedar Rapids, Iowa.

EXAMINATION OF COMPOSITE PIGMENT

Treating fillers, particularly calcined clay, with cationic reagents or polymers renders the normally anionic clay to have cationic charges. Titanium dioxide has a strong anionic charge. When dry blended it was hypothesized that there was chemical bonding between clay and titanium dioxide particles in the dry state. Samples of a dry blend prepared as detailed in Example I were examined with a scanning electron microscope. Separate samples of titanium dioxide and calcined clay prepared as described in Example I were also separately examined. The results of the examination of the dry blended materials was that the clay at a 20% addition to the $TiO_2$ could not be found as separate discrete particles. Attempts to use back scanning as a method of identifying the individual particles based on atomic number (molecular weight) were negative. The field of view showed no differentiation between particles and the results were as though the entire sample was homogeneous. Scanning electron microscope (SEM) photographs were taken of what appears to be calcined clay shaped particles completely covered with titanium dioxide particles. The flat, plate-like shaped particles of clay could barely be picked out of the entire field of the aggregated particles.

The dry blended filler/pigment was added to plastic at about 1% addition. Consistently, reflectivity curves, Hunter color values, on plastic chips made both with straight titanium dioxide and resin and those made with 80% $TiO_2$, 20% modified calcined clay, and resin appeared nearly identical. There does appear to be a slight color shift to the yellow side with the modified clay.

Samples of plastic chips containing the clay/$TiO_2$ aggregates described above were prepared and examined using the SEM. Plastic slivers were cut away from the ships to expose the clay/pigment by separating it from the plastic resin. (The plastic resin inhibited efforts to identify particulates embedded within the resin with surface examinations.) A streak of titanium dioxide/clay particles was found and SEM photographs were made. It was clear that the titanium dioxide particles that were revealed were bonded to the clay. The clay was pocked with $TiO_2$ particles. For some clay/$TiO_2$ aggregates, it appears that there were fewer $TiO_2$ particles adhered to the clay than the dry state. However, no free floating $TiO_2$ particles were observed. Possibly some $TiO_2$ particles were off of the clay particles during the injection molding. Nevertheless, the observation confirmed they hypothesis that the $TiO_2$ remains chemically bonded with the clay. This aggregation form of the dual pigment is believed to explain the high optical performance of the blend compared with straight $TiO_2$.

I claim:

1. A method for preparing kaolin for use as a pigment extender, comprising:
    (a) preparing a sprayable slurry comprising an aqueous hydrocolloid suspension of calcined anionic white kaolin particles in admixture with a cationic reagent capable of binding to said kaolin particles and making them cationic;
    (b) subjecting said slurry to drying in a spray dryer by atomizing droplets of a pressurized mixture of said slurry with an added gas to promote droplet fluffing and fragmentation; and
    (c) collecting a frangible dry material from said spray drying which material is cationic and which binds in dry condition to anionic titanium dioxide.

2. The method of claim 1 in which the aqueous hydrocolloid is a cooked starch suspension and said cationic reagent is poly(acrylamide).

3. The kaolin pigment extender material produced by the method of claim 1 or claim 2.

4. The method of preparing a composite white pigment product composed of titanium dioxide ($TiO_2$) and kaolin, comprising:
    (a) preparing a sprayable slurry comprising an aqueous hydrocolloid suspension of calcined anionic white kaolin particles in admixture with a cationic reagent capable of binding to said kaolin particles and making them cationic;
    (b) subjecting said slurry to drying in a spray dryer by atomizing droplets of a mixture of said slurry with pressurized air injected therein to promote droplet fluffing and fragmentation;
    (c) collecting a frangible dry material from said spray drying which material is cationic; and
    (d) blending portions of said cationic material with anionic titanium dioxide ($TiO_2$) pigment particles by mechanically mixing to bring the dry kaolin material into intimate contact with $TiO_2$ particles, said mixed blend containing composites of $TiO_2$ and kaolin particles and being composed by weight of from 5 to 40% of kaolin together with from 60 to 95% of $TiO_2$.

5. The method of claim 4 in which the aqueous hydrocolloid suspension is a cooked starch suspension and said cationic reagent is poly(acrylamide).

6. The mixed blend produced by the method of claim 4 or claim 5.

7. The method of claim 1 or claim 4 in which said cationic reagent is poly(acrylamide) having a molecular weight of at least 200,000 and containing cationic quaternary ammonium groups, said kaolin particles having a longest dimension of from 0.5 to 4 microns and said slurry containing from 0.1 to 2 parts by weight of said poly(acrylamide) per 100 parts of kaolin.

8. The method of claim 4 or 5 in which said mixed blend contains by weight from 10 to 30% kaolin together with 70 to 90% $TiO_2$.

* * * * *